May 24, 1960 J. AUGUSTIN ET AL 2,937,702
ONE WAY LINK SYSTEM BETWEEN TAPE BACK SPACING MEANS AND LEVER OPERATED CODE CANCELLING PUNCH
Filed Sept. 27, 1955
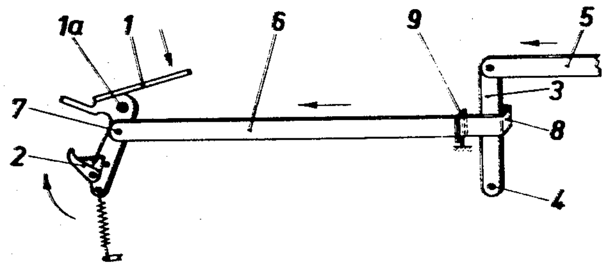
INVENTORS
J. AUGUSTIN-
H. WLODARCZAK
BY Robert Harding Jr.
ATTORNEY United States Patent Office 2,937,702

Patented May 24, 1960

2,937,702

ONE WAY LINK SYSTEM BETWEEN TAPE BACK SPACING MEANS AND LEVER OPERATED CODE CANCELLING PUNCH

Johann Augustin and Heinz Wlodarczak, Pforzheim, Germany, assignors to International Standard Electric Corporation, New York, N.Y., a corporation of Delaware Filed Sept. 27, 1955, Ser. No. 536,981

Claims priority, application Germany Oct. 1, 1954

2 Claims. (Cl. 164—112)

This invention relates to the improvements in apparatus for altering stored information in a record medium, and more particularly to the correction of errors which may occur in the perforation of perforated tapes as used in the printing telegraph art.

In the printing telegraph art, messages to be transmitted are first recorded on a perforated tape and then retransmitted from the tape. The tape is prepared by a tape perforating machine which is operated by a keyboard similar to a standard typewriter keyboard under control of which perforations corresponding to code signal combinations are punched across the width of the tape. The tape may then be inserted in a transmitter distributor which senses the perforations in the tape and transmits electrical conditions corresponding to the recorded code in the tape.

It sometimes becomes necessary for an operator perforating the tape to retrace his steps due to an error which he may have made in the perforation. For the correction of such errors, there is provided in the usual perforating machine, a lever known as the "back-space lever" and which serves to retransport the tape in a backward direction one elemental step for each depression of the lever. After having arrived at the location of the error, it is then incumbent upon the operator to manipulate the key known as the "letter-shift" key which records a series of perforations across the width of the tape and which thereby blanks out the error. This same letter-shift code combination must be applied to each of the code-combinations which succeeded the error until a point corresponding to blank tape is reached. Thereafter, the operator must depress the correct letter keys corresponding to letters which are required in the message or if figures were to be transmitted then the transmission thereof must be preceded by an actuation of the figure-shift key. Suffice to say, the prior art required that the letter-shift key be actuated in order to cancel the error.

This system of the prior art gave rise to the possibility that the operator might forget to actuate the letter-shift key and might after having retransported the tape back to the point of error immediately commence over-punching the perforation by the intelligence which should have been recorded. The purpose of this invention is to remove the possibility of such a second error occurring, it being within the purview of this invention to automatically perforate the tape with the letter-shift combination upon each actuation of the back-space lever.

It is a further feature of this invention to simultaneously over-print a characteristic legible marking on the face of the tape which corresponds to the letter-shift combination.

The above mentioned and other features and objects of this invention and the manner of attaining them will become more apparent and the invention itself will be best understood by reference to the following description of an embodiment of the invention taken in conjunction with the accompanying drawing which is a schematic representation of so much of a tape perforator which is required to illustrate the idea of the invention.

Referring now to the drawing there is shown a back-space lever 1 consisting of a bell crank lever and which is normally in the position shown and when required to be actuated is depressed in a downward direction in the direction of the straight arrow. The lever 1 pivots in a clockwise direction about the point 1*a*. The function of the lever is to move the tape feed pawl (not shown) out of mesh with the tape feed roll ratchet (not shown) thus effectively declutching the tape feed roll ratchet. In addition the back-space lever is provided with a back-space pawl 2 which is adapted to move against a tooth of a star wheel (not shown), which is included in the usual tape feeding device. The star wheel is thereby rotated backwards and causes the tape to move backwardly. The depression of the letter-shift key lever on the keyboard (not shown) causes the pivoting of a lever 3 which pivots counter-clockwise at point 4 under the urging of a coupling link member 5 which is attached to the key lever at its right hand end (not shown). We provide for an automatic operation of the letter-shift key mechanism whenever the back space lever 1 is actuated by means of a linkage member 6 which is pivotally mounted to the bell crank 1 at point 7 at one of its ends and is provided with a hook shaped end 8 at its opposite end. The hooked end 8 is adapted to partially encircle the lever 3 so that when the lever 1 is rotated clockwise, the linkage lever 6 is caused to move in a left hand direction and to urge the lever 3 in a counter-clockwise direction independent of operation of the letter-shift key on the keyboard. In order to properly guide the linkage member 6 we provide a suitable guide member 9 to maintain the lever 6 in proper position with respect to the lever 3. It will now be seen that upon actuation of the back-space lever 1, the letter shift mechanism is simultaneously caused to operate and the punching apparatus will thereupon record the letter-shift signal code combination on the tape.

The operator may then depress the spacing key for the number of spaces which correspond to the number of spaces over which the tape was conducted in reverse and thereupon clean, unprinted tape will be beneath the punch hammers ready to be properly punched.

This same arrangement in principle may be utilized for the correction of errors in magnetic tape or in any other recording medium.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. In a telegraph tape perforator of the kind in which the actuation of the keys causes code perforations to be punched across the width of the tape, a back-spacing key, back-spacing means controlled by said key for stepping said tape backwardly, a letter shift lever for actuating punching means for perforating the tape with an unbroken series of perforations extending across its width, and linkage means linking said back-space means and said letter shift lever whereby actuation of said back-spacing key causes said tape to be punched with said letter shift code but actuation of said letter shift lever by itself is without effect on said back-space means.

2. In an apparatus as claimed in claim 1, wherein said linkage means comprises a coupling element having one end pivotally connected to said back-spacing means, and having its other end formed in an L-shape whereby to coact with said letter-shift lever upon actuating of said back-space means.

References Cited in the file of this patent

UNITED STATES PATENTS

| | | |
|---|---|---|
| 944,590 | Beyerlen | Dec. 28, 1909 |
| 974,649 | Fishburne | Nov. 1, 1910 |
| 1,095,056 | Winton | Apr. 28, 1914 |
| 1,335,631 | Youmans | Mar. 30, 1920 |
| 1,362,446 | St. Onge | Dec. 14, 1920 |
| 1,362,758 | Stoltz | Dec. 21, 1920 |
| 1,440,296 | Hokamp | Dec. 26, 1922 |
| 1,798,610 | Lasker | Mar. 31, 1931 |
| 2,377,801 | Mills | June 5, 1945 |
| 2,633,965 | Johnston | Apr. 7, 1953 |
| 2,675,110 | Yaeger | Apr. 13, 1954 |